US006961417B2

(12) United States Patent
Koch

(10) Patent No.: US 6,961,417 B2
(45) Date of Patent: Nov. 1, 2005

(54) SYSTEM AND METHOD FOR REAL-TIME PROVISIONING OF CENTRAL OFFICE SERVICES

(75) Inventor: Robert A. Koch, Norcross, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 916 days.

(21) Appl. No.: 09/908,761

(22) Filed: Jul. 19, 2001

(65) Prior Publication Data

US 2004/0114745 A1 Jun. 17, 2004

(51) Int. Cl.[7] .............................................. H04M 3/42
(52) U.S. Cl. ............................ 379/207.02; 379/221.08
(58) Field of Search ................................ 379/207, 230, 379/201, 219, 220, 229, 207.02, 221.08; 709/203, 217, 218, 245

(56) References Cited

U.S. PATENT DOCUMENTS 6,115,737 A * 9/2000 Ely et al. ..................... 709/203
6,181,787 B1 * 1/2001 Malik ...................... 379/207.11

* cited by examiner

Primary Examiner—Fan Tsang
Assistant Examiner—Olisa Anwah
(74) Attorney, Agent, or Firm—Walters & Zimmerman; Geoff Sutcliffs; Todd Mitchem

(57) ABSTRACT

A system and method for enabling customers of communication services to subscribe or modify pre-provisioned communication services and allowing the customers to retrieve in real-time the status of the pre-provisioned services and the parameters of their subscribed services. Once a request is received from an Internet interface device of a customer, a service provider server ("SPS") formulates an appropriate message in an Internet protocol ("IP") and forwards the message to a Service Control Point ("SCP"). The SCP formulates an advanced intelligence network ("AIN") protocol message from the IP message and forwards the AIN message to a switch. The switch takes appropriate action in response to the AIN message and returns a response to the SCP. The SCP formulates an IP message and transfers the IP response to the SPS. The SPS delivers information from the IP response to the Internet interface of the customer. Depending on the content of the customer's request, modifications of the customer's subscription data may occur in the storage elements associated with the SPS and SCP. Furthermore, depending on the content of the customer's request, the SPS may send an IP message to a network element other than the SCP.

8 Claims, 8 Drawing Sheets

SYSTEM AND METHOD FOR REAL-TIME PROVISIONING OF CENTRAL OFFICE SERVICES

TECHNICAL FIELD

This invention relates in general to providing communication services to customers, and in particular, to providing real-time status, subscriptions, and modifications of pre-provisioned communication services and parameters.

BACKGROUND OF THE INVENTION

The conventional method of provisioning communication services is slow and labor-intensive. First, disseminating the information regarding available communication services to customers is costly and difficult. In many cases, customers are not aware of some of the services which are available and could be quite useful to them. Second, in general, subscribing to or modifying communication services requires a telephone call to a customer representative. For example, if a customer wishes to request Call Waiting service, the customer makes a telephone call to a service representative, who creates a service order. The information on the service order is entered into a service management system, which in turn transfers messages to the appropriate telephone network elements. The information on the service order is also entered into a billing system. In general, the conventional method takes a couple of days before the services that the customer has requested or modified can be effectuated. Furthermore, the manual processing involved is costly and the process of entering the information provided by the customer to the service representative into appropriate systems increases the delay and the likelihood of introducing errors into the system.

There also exist conventional methods that allow a customer to change the customer's communication services using a touch-tone telephone or the Internet. However, these methods also result in a service order, which requires intermediaries to enter appropriate data into the telephone network elements and the billing system. Accordingly, these conventional methods fail to effectuate in real-time the customer's request to change his communication services.

In addition, the conventional methods that allow a customer to review the status of his communication services via the Internet provide only information that is stored in a database associated with the service provider's computer server. The conventional methods do not provide parameters associated with certain services which are stored in a database of the switch that is associated with the customer's subscriber line. Accordingly, the information that the customer can view using the conventional methods does not include the parameters associated with certain communication services.

The conventional methods for effectuating a customer's request to modify his communication services are slow and costly. The conventional methods for allowing the customer to view his communication services are inadequate. Thus, there is a need for a system and method for effectuating in real-time subscriptions to or modifications of communication services, as well as allowing the customer to view the status and parameters of his communication services.

SUMMARY OF THE INVENTION

The present invention enables a customer to view and modify his services in real-time. According to the principles of the present invention, when a customer accesses via the Internet the computer server of a service provider, message transfers that include the computer server, a switch and other network elements take place. The message transfers of the present invention allow the provision of parameters associated with certain communication services and the activation of a customer's request relating to his communication services in real-time.

Accordingly the present invention eliminates the intermediate steps associated with providing new subscriptions or effectuating modifications of subscribed services. In particular, the present invention effectuates the customer's request by modifying appropriate network elements, including the switch, in real-time. Thus, the present invention reduces the cost and delay associated with providing communication services, as well as the likelihood of introducing errors in the process of providing communication services. Furthermore, the present invention allows a customer to view both the status and parameters of his communication services.

For those customers who prefer to use a customer representative, they can relay their request to a customer representative, who then uses the present invention to effectuate the request in real-time.

The present invention uses the Internet and the Advanced Intelligence Network (AIN) to enable real-time provisioning of central office services. Each subscriber line is provided with pre-provisioned services. Each of the pre-provisioned services is deactivated unless the customer requests an activation of the service.

When a customer accesses the web page of the service provider, the service provider's server ("SPS") determines the validity of the customer's identification using the customer's directory number and password. Upon the validation of the customer's identification, the SPS sends a request message which is formatted in an Internet protocol ("IP"), such as Transmission Control Protocol and Internet Protocol, to an advanced intelligence network ("AIN"), comprising a Service Control Point ("SCP"). The SCP formulates the IP request message into a request message formatted in an AIN protocol, such as Transactional Capabilities Application Part ("TCAP"), and forwards the AIN request message to a switch. Upon receiving the AIN request message, the switch provides the status and parameters for each of the pre-provisioned services, corresponding to the customer's directory number, to the SCP. The SCP formulates a response message formatted in an IP and forwards the IP formatted response to the SPS. The SPS delivers information from the IP formatted response to the customer's Internet interface device, thereby enabling the customer to view the status of his pre-provisioned services and the parameters of his subscribed services.

Upon reviewing the status and parameters, the customer can submit a request to modify his communication services by clicking appropriate links and/or entering new data. For example, he can activate a pre-provisioned Service_X by clicking on a Service_X link and providing information prompted for, if any. Upon receiving the customer's request, the SPS formulates an IP request and sends the request to the SCP. Depending on the customer's request, the SPS may also modify the customer's subscription data stored in a storage element associated with the SPS. In addition, depending on the customer's request, the SPS may send an IP request message to additional network elements, that is, to components other than the SCP.

Upon receiving the IP request from the SPS, the SPC formulates an AIN request and sends the AIN request to the switch. Depending on the content of the IP request from the SPS, the SCP may modify the customer's subscription data stored in a storage element associated with the SCP. If the SCP needs to modify the customer's subscription data stored in a storage element associated with the SCP, the modification is accomplished before the SCP forwards an AIN request to the switch. Similarly, when another network element receives an IP request message from the SPS and needs to modify the customer's subscription data stored in a storage element associated with it, the modification is accomplished before the switch activates or deactivates a trigger.

Upon receiving the AIN request, the switch either modifies the customer's subscription data stored in a storage element associated with it or modifies an appropriate trigger identified by the AIN request. After the modification of the customer's subscription data or the appropriate trigger, the switch formulates an AIN response and sends the response to the SCP.

Upon receiving the AIN response, the SCP formulates an IP response and sends the IP response to the SPS. The SPS finally delivers to the Internet interface device of the customer information from the IP response. If the customer's billing information needs to be changed, the SPS also forwards appropriate billing information to a billing system.

These and other aspects, features and advantages of the present information may be more clearly understood and appreciated from a review of the following detailed description of the disclosed embodiments and by reference to the appended drawings and claims.

DETAILED DESCRIPTION OF THE INVENTION

Figure 1:
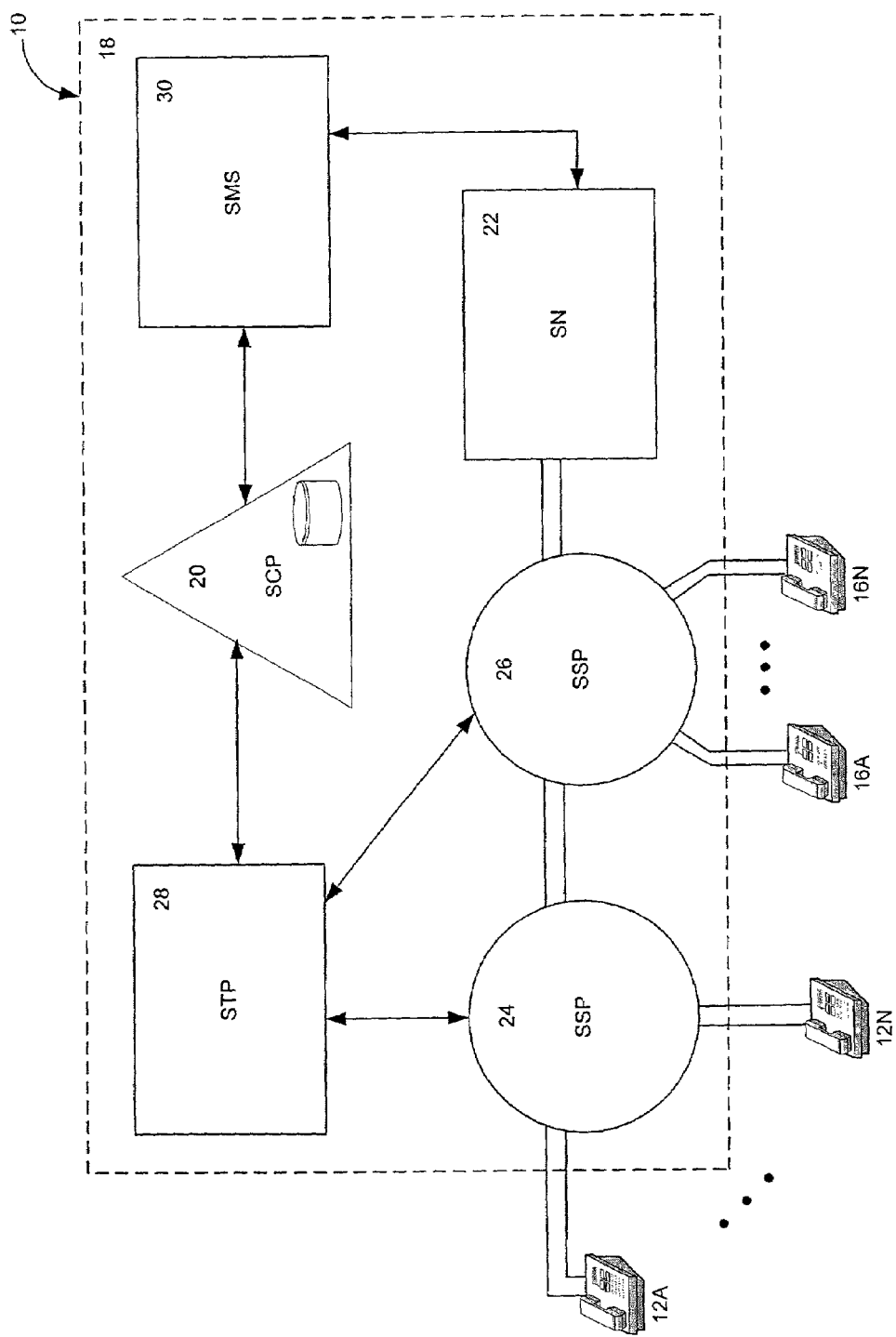
FIG. 1 is a block diagram of a portion of the PSTN.

FIG. 1 illustrates a representative portion of a public switched telecommunications network ("PSTN") 10, comprising a plurality of termination units, commonly designated as 12 and 16, and an Advanced Intelligence Network ("AIN") 18, which is well-known to those skilled in the art.

The AIN 18 comprises a Service Control Point ("SCP") 20, a Service Node ("SN") 22, Service Switching Points ("SSP's") 24 and 26, a Service Transfer Point ("STP") 28, and a Service Management System ("SMS") 30. The SCP 20 can be viewed as a server with a database. For example, it receives call information in a query from a SSP and translates query information into routing instructions for the SSP's. The SN 22 is typically connected to the SSP's through Integrated Service Digital Network ("ISDN") lines and supports special services. The SSP's 24 and 26 are also referred to as central office switches. The STP 28 is utilized in linking the SSP's to the SCP. The SMS 30 provides a centralized platform for remotely programming the SCP 20 and the SN 22. For example, when a customer wishes to subscribe to a new service, appropriate data is entered into the SMS 30, and the SMS 30, in turn, downloads information to the database associated with the SCP 20. Accordingly, those skilled in the art will understand that the consequences of the present invention include removing some of the responsibilities of the SMS. For example, the present invention eliminates the SMS from the process of effectuating a new communication service in certain circumstances.

Exemplary Operating Environment

Figure 2:
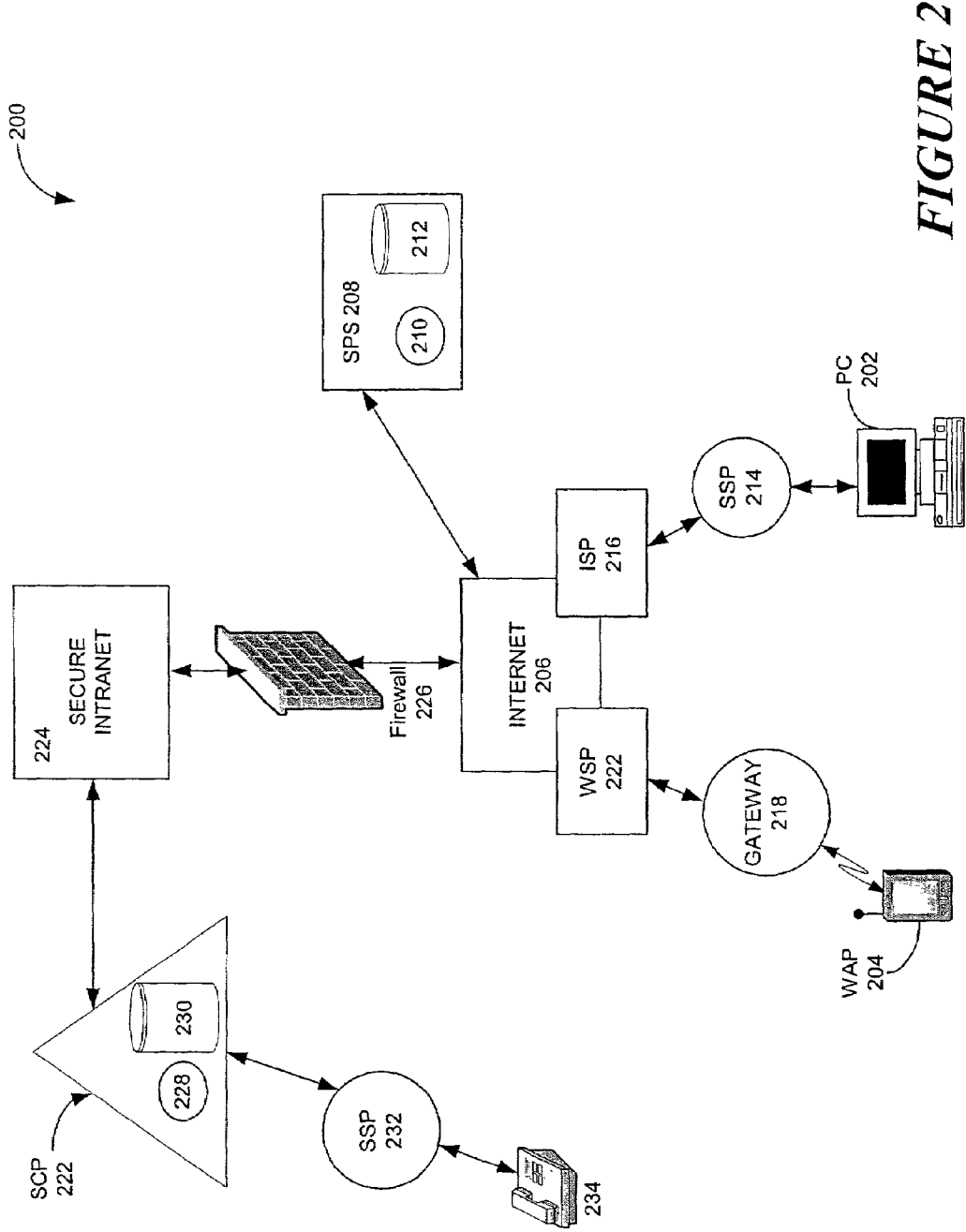
FIG. 2 is a block diagram illustrating an exemplary operating environment for an embodiment of the present invention.

FIG. 2 shows an exemplary operating environment 200 for an embodiment of the present invention. A user of the present invention employs either a wireline device such as a personal computer ("PC") 202 or a wireless device such as a Wireless Application Protocol ("WAP") device 204 to connect to the Internet 206 and access a web page from a Service Provider's Server ("SPS") 208. Some other examples of devices that a customer can use to interface with the Internet include a wireless Personal Digital Assistant ("PDA"), a Pocket PC, a 2-way pager, as well as a Web Appliance. The SPS 208 includes, among other things, a real-time provisioning application ("RPA") 210 and is associated with a customer database 212. In general, a user of a wireline device connects to the Internet 206 via a SSP 214 and employs services provided by an Internet service provider ("ISP") 216. In general, a user of a wireless device connects to the Internet 206 via a gateway 218 and employs services provided by a wireless service provider ("WSP") 220.

Based on the information provided by the user, the SPS 208 transmits to a Service Control Point (SCP) 222 an appropriate message formatted in an Internet protocol (IP), such as TCP/IP (Transmission Control Protocol and Internet Protocol). In general, the message transfers between the SPS 208 and the SCP 222 are accomplished via a Secure Intranet 224, which is accessible via the Internet 206 but is securely separated by a firewall 226. The secured message transmission via the Internet is well-known to those skilled in the art.

The SCP 222, among other things, includes a real-time provisioning Service Package Application ("RSPA") 228 and is associated with a database 230. The SCP 222 analyzes the message from the SPS 208 and exchanges messages with a Service Switching Point ("SSP") 232. In particular, the SCP 222 formulates a message in an AIN protocol, such as Transmission Capabilities Application Part ("TCAP"), and forwards the AIN message to the SSP 232. Depending on the content of the AIN message from the SCP 222, the SSP 232 either simply transmits the customer's subscription data to the SCP 222, or modifies the customer's subscription data stored in a storage element associated with the SSP 232 and transmits the modified customer's subscription information to the SCP 222. The response from the SSP 232 is formatted in an AIN protocol.

FIG. 2 illustrates two separate SSP's, however, those skilled in the art will understand that the SSP 214 and the SSP 232 may be the same switch. FIG. 2 also illustrates two separate subscriber lines connecting the PC 202 and the telephone 234. However, those skilled in the art will understand that the PC 202 and the telephone 234 can operate using the same subscriber line.

Upon receiving the AIN response from the SSP 232, the SCP 222 formulates an IP response and forwards the IP formatted response to the SPS 208. Upon receiving the IP response, the SPS 208 delivers information contained in the IP response to the user's Internet interface device, thereby effectuating in real-time the user's request to modify a service or providing in real-time parameters associated with certain pre-provisioned communication services. If the customer's bi changed after the effectuation of the customer's request, the SPS 208 forwards appropriate billing information to a billing system.

The preferred embodiment of the present invention provides a list of pre-provisioned services to a customer. There are two types of pre-provisioned services. The first type includes switch-based services, which, in general, require a modification only to the customer's subscription data stored in a database associated with the SSP 232. Examples of a switch-based service include Anonymous Call Rejection, Outside Calling Area Alerting, Call Waiting, Calling Number Delivery Blocking, Call Forwarding, and Ring Control. The second type includes network-based services. The network-based services include those defined in the specifications of the AIN, as well as those supported by the AIN although not defined in the AIN specification. Examples of a network-based service includes Area Calling Name Service, Calling Name Delivery Service, and Automatic Flexible Routing.

The network-based services require, in general, a modification of a customer's subscription data in a storage element associated with the SCP 222, and a modification of an AIN trigger in the SSP 232. A trigger serves as an indication for the SSP to take certain action. When a set of pre-determined conditions are detected, a trigger is generated and the SSP generates and transmits a query message to the appropriate network component. The SSP suspends call processing until a response message is received or a default timer times out. If a response message is received, then the SSP processes the call as specified in the response message. However, if no response message is received and the default timer times out, then the SSP executes a default task. In addition, depending on the type of the AIN service involved, a modification of the customer data stored in a storage element associated with an AIN element other than the SCP may be required.

Each pre-provisioned service is associated with a status field which indicates if the corresponding service is activated or deactivated. Furthermore, certain pre-provisioned services are associated with parameter fields. For example, the Ring Control service includes a parameter for the customer to specify the number of ring cycles to be played before an incoming call is forwarded.

The following descriptions illustrate how a customer's status information is retrieved in real-time from a SSP, how a customer's request to activate a switch-based service is effectuated in real-time, and how a customer's request to activate a network-based service is effectuated in real-time.

Real-Time Access of the Subscription Information

Figure 3:
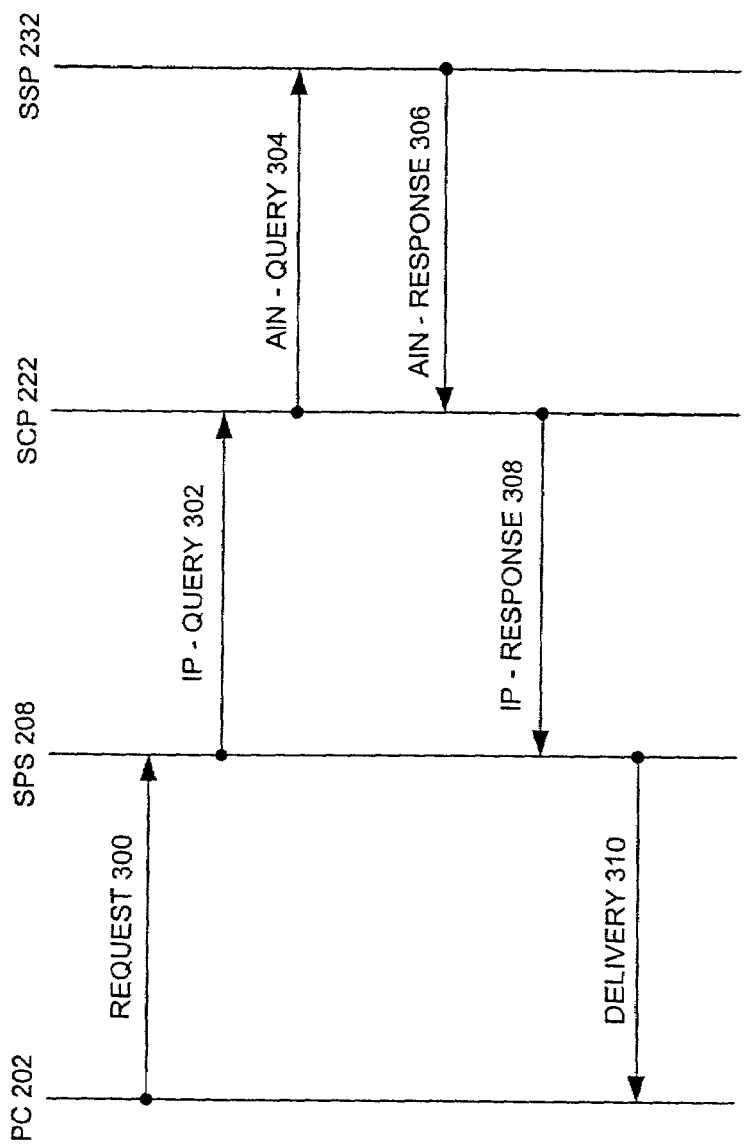
FIG. 3 is a block diagram illustrating an exemplary messaging between the components of FIG. 2, in accordance with an embodiment of the present invention.

FIG. 3 shows the transfers of messages between the PC 202, the SPS 208, the SCP 222, and the SSP 232 when a user of the present invention initially accesses the web page of a communication service provider. The user may wish to request a new service, modify a current service, or simply view the status of the user's current services. For simplicity, the connecting elements between the PC 202 and the SPS 208 and the elements between the SPS 208 and the SCP 222 are not illustrated.

Figure 4:
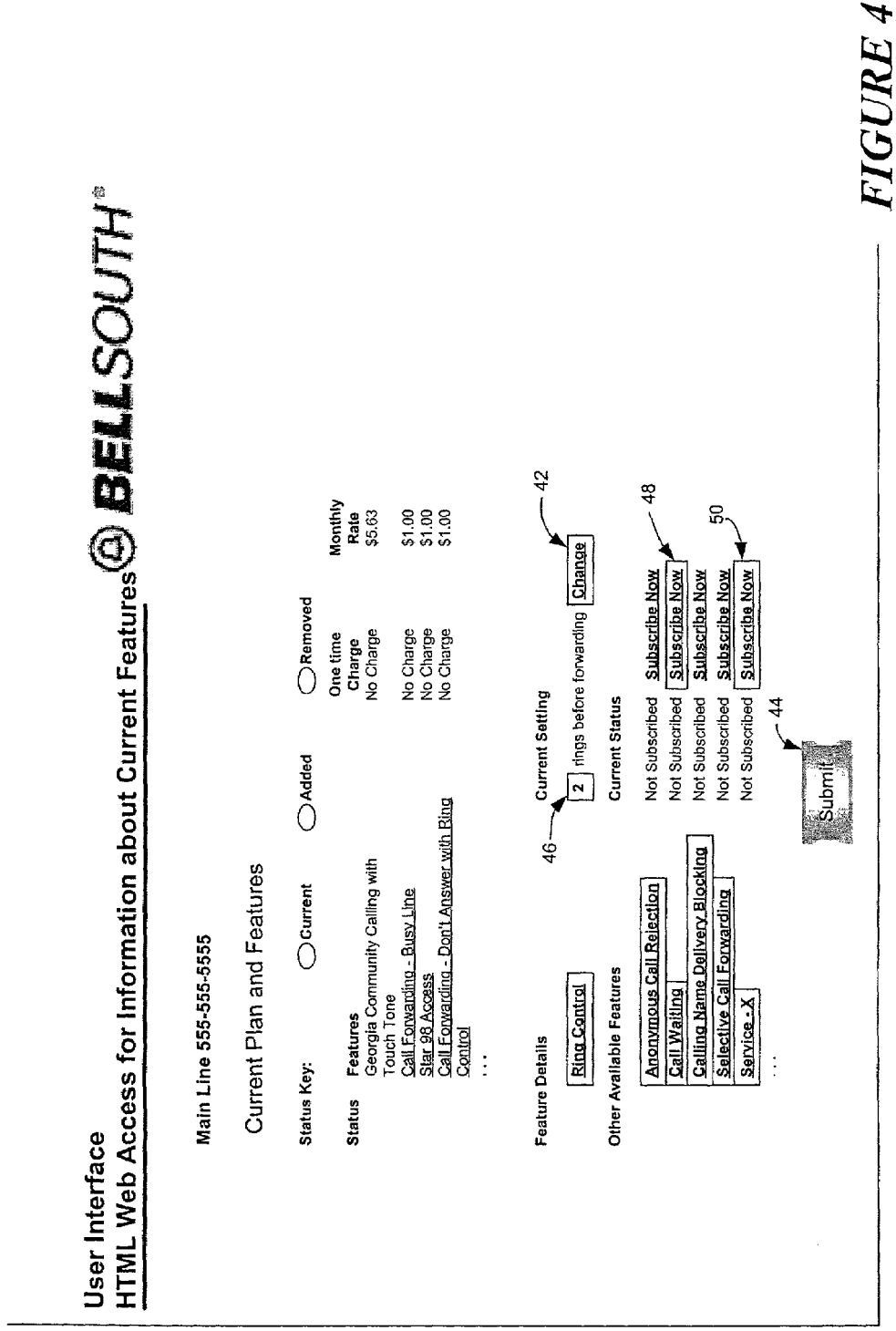
FIG. 4 is an exemplary view of an output provided to a user of the present invention, in accordance with an embodiment of the present invention.

Referring to FIG. 3, when the user first accesses the SPS 208, the transfers of messages between the components illustrated in FIG. 2 begin with a REQUEST message 300, which includes the directory number (DN) for the subscriber line associated with the services and the customer's password. The DN is associated with the telephone 234 which is associated with the SSP 232. Upon receiving the DN and the password, the RPA 210 which resides in the SPS 208 determines if the DN and the password are valid, using the information stored in the database 212. The information stored in the database 212 identifies the customer's services, but does not include any parameter information associated with the services. The parameters are stored in the SSP 232. Upon the validation of the DN and the password, the RPA launches an IP_QUERY message 302, which is formatted in an Internet protocol ("IP"), and causes the message 302 to be forwarded to the SCP 222. The IP_QUERY message 302 includes the DN and identifies the customer's subscribed services. At the SCP 222, upon receiving the IP_QUERY message 302, RSPA 228 formulates an AIN_QUERY message 304, which is formatted in an AIN protocol and is forwarded to the SSP 232. The AIN_QUERY message 304 comprises information fields for UserIdentification, Service, and Request Action. In general, the DN is provided in the UserIdentification field; the customer's subscribed services are provided in the Service field; and the status and the parameters for each subscribed service are requested in the Request Action field. In response to receiving the AIN_QUERY message 304, the SSP 232 returns an AIN_RESPONSE message 306, which is formatted in an AIN protocol, to the SCP 222. The AIN_RESPONSE message 306 comprises information fields for UserIdentification, Service, and Result. In general, the DN is provided in the UserIdentification field; the customer's subscribed services are provided in the Service field; and the status and the parameters for each subscribed service are provided in the Result field. At the SCP 222, the RSPA 228 formulates an IP_RESPONSE message 308, which is formatted in an Internet protocol and comprises the DN and information regarding the customer's subscribed services, including the status for each pre-provisioned service and parameters for each subscribed service. The SCP 222 forwards the IP_RESPONSE message 308 to the SPS 208. Upon receiving the IP_RESPONSE message 308, the SPS 208 causes a DELIVERY message 310 to be transferred to the PC 202. Upon the receipt of the DELIVERY message 310, the screen display of PC 202 is updated to display the status and parameters associated with the DN, which is associated with the telephone 234. Thus, according to the principles of the present invention, a customer can view the status and parameters for his pre-provisioned communication services. FIG. 4 shows an exemplary view of the screen of the PC 202 when the user accesses the web page of the service provider to review the user's current services. FIG. 4 illustrates that the user subscribes to a number of services, including Ring Control, and that the parameters for Ring Control indicate that two rings occur before forwarding.

Real-Time Modification of a Service Parameter

Figure 5:
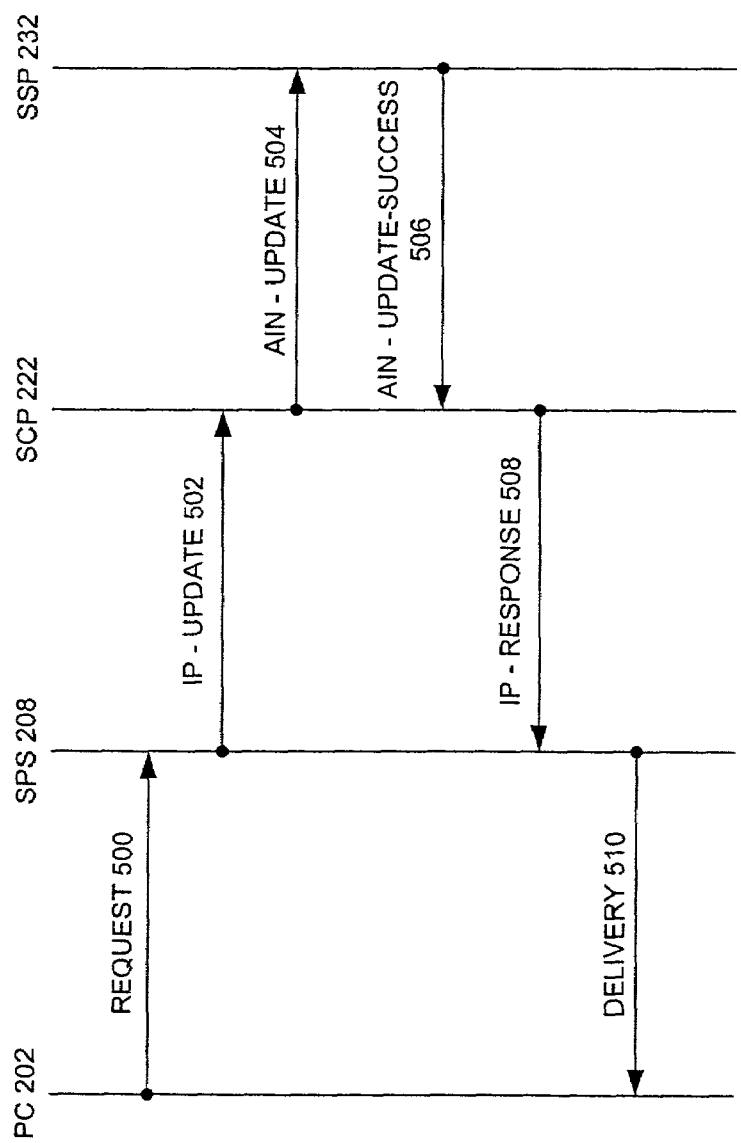
FIG. 5 is a block diagram illustrating an exemplary messaging between the components of FIG. 2, in accordance with an embodiment of the present invention.

FIG. 5 illustrates the transfers of messages that occur when a customer wishes to change a service parameter. For example, if the customer wishes to change the number of rings before a call is forwarded to another telephone number or an announcement, he clicks on the Ring Control Change link shown on the screen of the PC 202 (FIG. 4, box 42) and enters a new value in the parameter field for the Ring Control service. When the customer submits his request by clicking, for example, a submit link (FIG. 4, box 44), he causes a REQUEST message 500 to be sent to the SPS 208. Upon receiving the REQUEST message 500, the RPA 210 in the SPS 208 formulates an IP_UPDATE message 502, formatted in an Internet protocol, and forwards the message to the SCP 222. For the customer's Ring Control Change request, the IP_UPDATE message 502 comprises information fields for UserIdentification, Service, and Update Action. In this example, the customer wishes to change the number of rings from two to three. The DN is provided in the UserIdentification field, Ring Control is provided in the Service field, and three (3) is provided in the Update Action field. At the SCP 222, the RSPA 228 formulates an AIN_UPDATE message 504, which is formatted in an AIN protocol, and causes the message to be forwarded to the SSP 232. In this example, the AIN_UPDATE message 504 comprises information fields for SSPUserResourceID, Service, and Delay Interval. The DN is provided in the SSPUserResourceID field, Ring Control is provided in the Service field, and three (3) is provided in the Delay Interval field. Upon receiving the AIN_UPDATE message 504, the appropriate information in the customer's subscription data stored in a storage element associated with the SSP 232 is modified. After modifying the appropriate data, the SSP 232 acknowledges the AIN_UPDATE message 504 by sending an AIN_UPDATE_SUCCESS message 506 to the SCP 222, which is formatted in an AIN protocol and comprises a Return Result component. The Return Result component indicates that the update was successful. Upon receiving the acknowledgement, the RSPA 228 in the SCP 222 formulates an IP_RESPONSE message 508 and causes the message to be forwarded to the SPS 208. The IP_RESPONSE message 508 is formatted in an Internet protocol and comprises the DN and an update success indicator. An update success indicator indicates that the parameter was successfully updated in real-time. Finally, the SPS 208 generates and forwards a Delivery message 510 to the PC 202 of the customer. The DELIVERY message 510 includes information to update the screen display of the PC 202 for the customer's review. In this example, the number in the box 46 in FIG. 4 changes from two (2) to three (3), thereby notifying the customer that his request has been effectuated in real-time for the DN associated with the telephone 234. Accordingly, the customer is enabled to modify in real-time a parameter of one of his subscribed services.

Real-Time Activation of a Switch-Based Service

Figure 6:
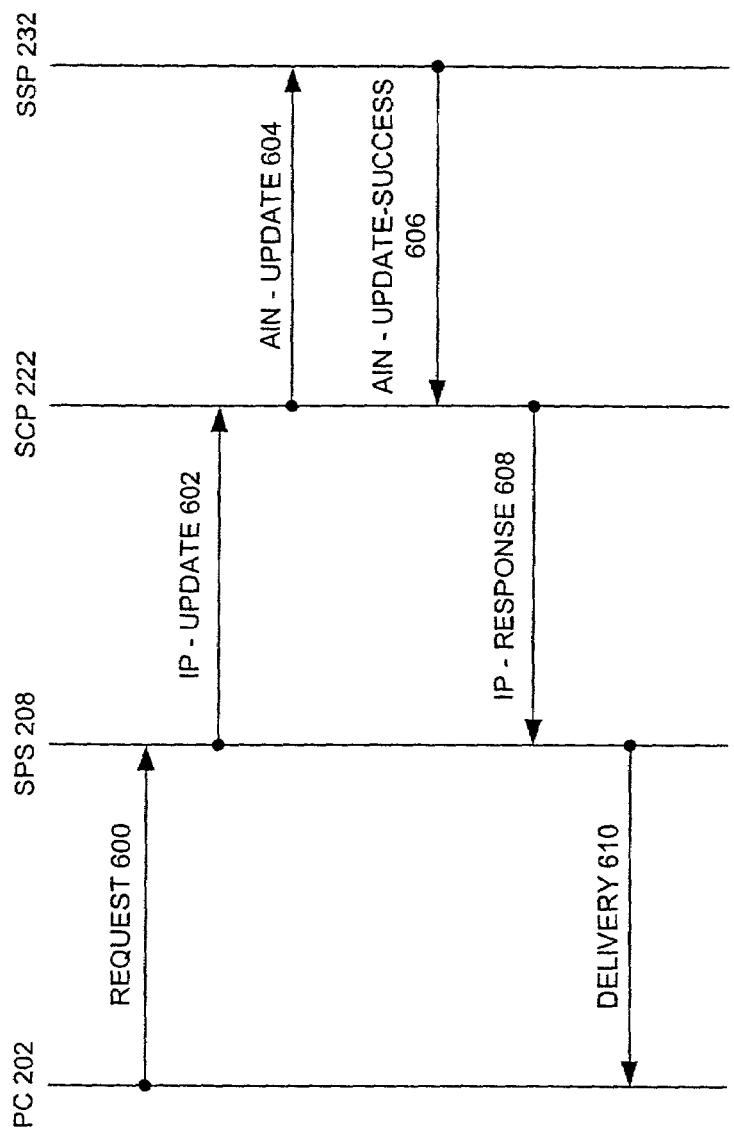
FIG. 6 is a block diagram illustrating an exemplary messaging between the components of FIG. 2, in accordance with an embodiment of the present invention.

FIG. 6 illustrates the transfers of messages that occur when a customer wishes to activate a pre-provisioned communication service that requires a modification only to the customer subscription data stored in a storage element associated with the SSP 232. In other words, the customer's request involves a switch-based service. For example, if the customer wishes to activate the call waiting service, he clicks a Call Waiting Subscribe link on the screen of the PC 202 (FIG. 4, box 48) and submits his request by clicking, for example, the submit link (FIG. 4, box 44). The customer causes a REQUEST message 600 to be sent to the SPS 208. Upon receiving the REQUEST message 600, the RPA 210 in the SPS 208 formulates an IP_UPDATE message 602 and forwards the message to the SCP 222. The IP_UPDATE message 602 is formatted in an Internet protocol and comprises information fields for UserIdentification, Service and Update Action. In this example of activating the call waiting service, the UserIdentification field is set to the DN of the customer, the Service field is set to Call Waiting, and the UpdateAction field is set to Activate. At the SCP 222, the RSPA 228 formulates the IP_UPDATE message 602 into an AIN_UPDATE message 604 and causes the message to be forwarded to the SSP 232. The AIN_UPDATE message 604 is formatted in an AIN protocol and comprises information fields for SSPUserResourceID, Service and Update Action. In this example, the SSPUserResourceID field is set to DN, the Service field is set to Call Waiting, and the UpdateAction field is set to Activate. Upon receiving the AIN_UPDATE message 604, the appropriate information in the customer's subscription data stored in a storage element associated with the SSP 232 is modified. After modifying the appropriate data, the SSP 232 sends an AIN_UPDATE_SUCCESS message 606 to acknowledge the AIN_UPDATE message 604 to the SCP 222. The AIN_UPDATE_SUCCESS message 606 is formatted in an AIN protocol and includes a Return Result component. The Return Result component indicates that the update was successful. Upon receiving the acknowledgement, the RSPA 228 in the SCP 222 formulates an IP_RESPONSE message 608 and causes the message to be forwarded to the SPS 208. The IP_RESPONSE message 608 is formatted in an Internet protocol and comprises the DN and an update success indicator. An update success indicator indicates that the service request is successfully effectuated in real-time. Upon receiving the IP_RESPONSE message 608, the SPS 208 generates and forwards a DELIVERY message 610 to the PC 202. The DELIVERY message 610 includes information to update the screen display of the PC 202 for the customer's review. The PC 202 displays the changed status for the Call Waiting service for the DN associated with the telephone 234 and the SSP 222. Finally, SPS 208 forwards appropriate billing information for the subscriber line associated with the DN to a billing system. A similar approach is taken if the customer requests deactivation of a switch-based communication service.

Another Aspect of the Exemplary Operating Environment

Figure 7:
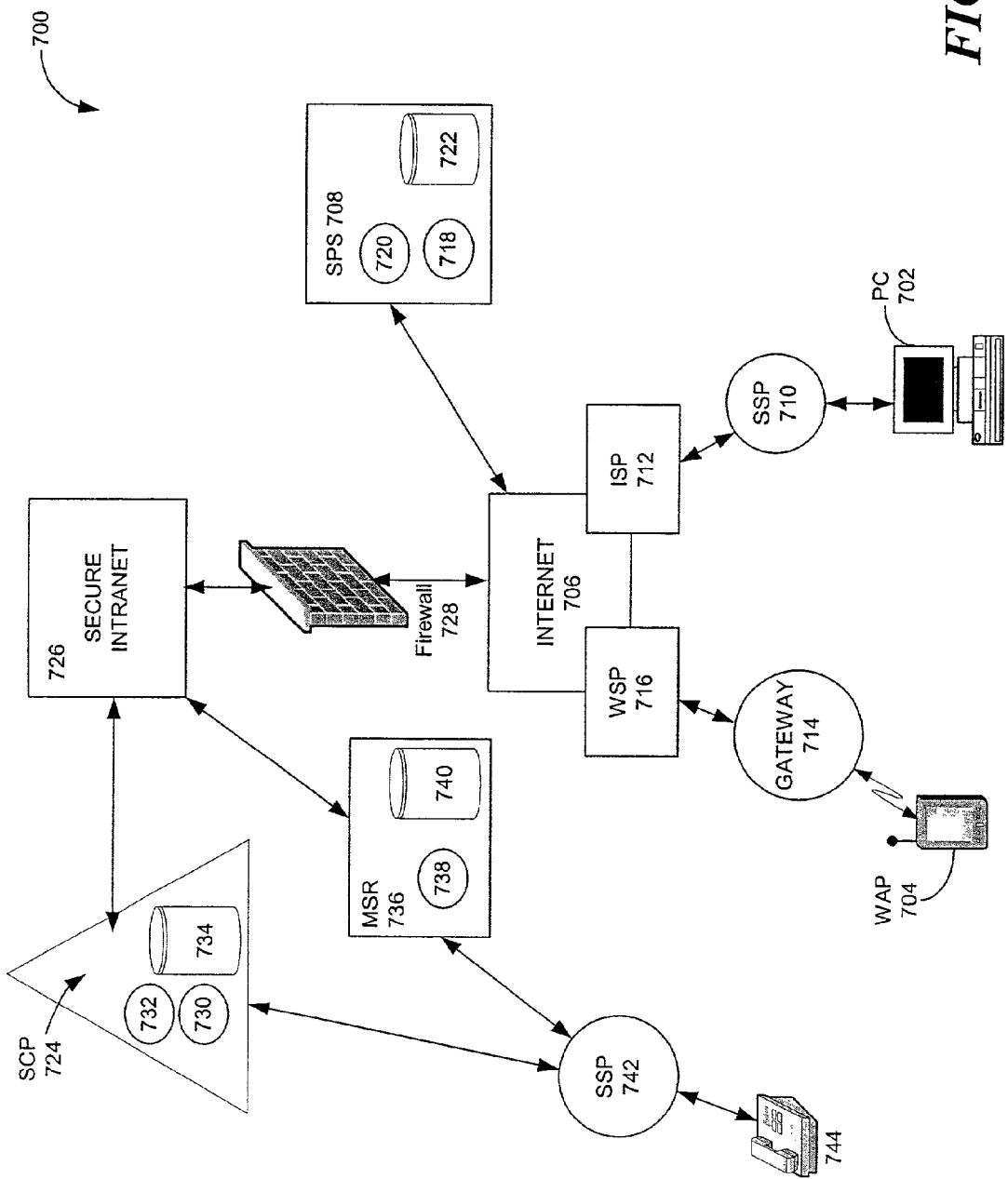
FIG. 7 is a block diagram illustrating an exemplary operating environment for another embodiment of the present invention.

FIG. 7 illustrates another aspect of the exemplary operating environment 700 which shows the components employed when a customer wishes to activate a network-based pre-provisioned service. Network-based services include the services defined in the specifications for the AIN and other communication services supported by the AIN. Referring to FIG. 7, a user employs either a wireline device such as a PC 702 or a wireless device such as a WAP 704 to connect to the Internet 706 and access a web page of a service provider. As discussed previously, a customer who connects to the Internet 706 using a wireline devices, such as the PC 702, utilizes services provided by a SSP 710 and an Internet service provider ("ISP") 712, while a customer who connects to the Internet 706 using a wireless device, such as the WAP 704, utilizes services provided by a wireless gateway 714 and a wireless service provider ("WSP") 716. The service provider's server ("SPS") 708 comprises a real-time provisioning application (RPA) 718 and application programs to enable real-time subscriptions and modifications of network-based services. The SPS 708 is also associated with a storage element 722.

Upon receiving a message from the customer's Internet interface device, that is, either the PC 702 or the WAP 704, the SPS 708 formulates a query formatted in an Internet protocol and forwards the query to the SCP 724. For certain services, the SPS may also modify the customer's subscription information stored in the storage element 722 prior to sending the query message to the SCP 724. In general, the message transfers between the SPS 708 and the SCP 724 are accomplished via a Secure Intranet 726, which is accessible and securely separated from the Internet 706. A firewall 728 is used to provide the Internet security and is well-known to those skilled in the art. The SCP 724, among other things, comprises a real-time Service Package Application ("RSPA") 730 and a network-based Service Package Application ("NSPA") 732 for each network based service and is associated with a storage element 734.

In addition, depending on the content of the message it receives from the customer's Internet interface device, the SPS 708 forwards the same query message that it formulated for the SCP 724 to another network element, or a formulates a second IP query and forwards the second query message to another network element. That is, the SPS 708 determines whether more than one network element needs to receive a message regarding the customer's request relating to a network-based service. Depending upon the determination, the SPS 708 sends either a single message or a plurality of messages to the appropriate network elements. In FIG. 7, a Media Resource Server ("MRS") 736 is provided as an example of another network element. The MRS 736 comprises a network media service application program ("NMSA") 738 and is associated with a storage element 740.

In responding to a query from the SPS 708, the SCP 724 modifies the customer's subscription data stored in its corresponding storage element 734. If another network element receives a query from the SPS 708, the customer's subscription data stored in a storage element corresponding to the network element is also modified. For example, if the SPS 708 forwards a query message to the MRS 736, then the customer's subscription data in the storage element 740 is also modified. Those skilled in the art will understand that the modifications of the customer's subscription data in the appropriate network elements are accomplished before the trigger in the S SP 742 is either activated or deactivated.

After modifying the data in its corresponding storage element 734, the SCP 724 formulates a message in an AIN protocol, such as TCAP, and forwards the AIN message to the SSP 742. In response to receiving the AIN message from the SCP 724, the SSP 742 activates an appropriate trigger, then acknowledges the SCP 724. To ensure that appropriate data are modified in additional network elements that may have received IP messages from the SPS 708 prior to the activation or deactivation of a trigger at the SSP, SCP 724 exchanges messages formatted in AIN protocols, such as TCAP, before forwarding a message to the SSP. As an example, SCP 724 exchanges AIN messages with MRS 736 to ensure that appropriate data are modified at MRS 736 before sending a message to the SSP 742.

In response to receiving the acknowledgement from the SSP 742, the SCP 724 formulates an IP response message and forwards the IP response message to the SPS 720. Upon receiving the IP response message, the SPS 708 delivers to the customer's Internet interface device information from the IP response message. If the customer's billing information needs to be changed after the effectuation of the customer's request, the SPS 708 forwards appropriate billing information to a billing system.

FIG. 7 illustrates two separate SSP's, however, those skilled in the art will understand that the SSP 710 and the SSP 742 may be the same switch. FIG. 7 also illustrates two separate subscriber lines for PC 702 and the telephone 742. However, those skilled in the art will understand that the PC 702 and the telephone 742 can operate using the same subscriber line.

Real-Time Activation of a Network Based Pre-Provisioned Service

Figure 8:
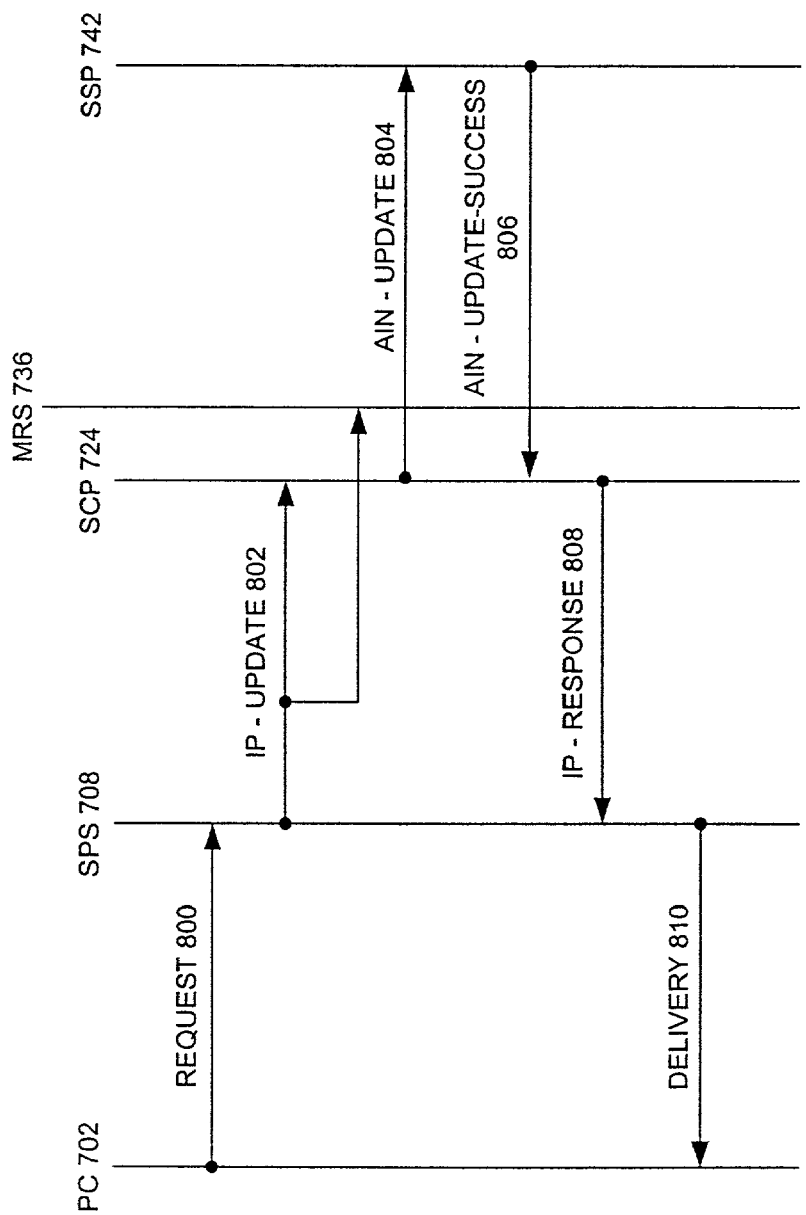
FIG. 8 is a block diagram illustrating an exemplary messaging between the components of FIG. 7, in accordance with another embodiment of the present invention.

FIG. 8 illustrates the message transfers that occur when a user of the present invention wishes to activate a network-based service, Service__X, using the PC 702. For simplicity, the connecting components between the PC 702 and the SSP 708, between the SSP 708 and the SCP 724, and between the SSP 708 and the MRS 736 are not illustrated in FIG. 8. To activate a network-based service, Service__X, the user clicks the Service__X Subscribe link on the screen of the PC 702 (FIG. 4, box 50). The clicking of the Service__X Subscribe link (FIG. 4, box 50) may invoke a secondary window which prompts for additional subscriber's data. When the user submits the request by clicking, for example, a Submit link (FIG. 4, box 44), a REQUEST message 800 is forwarded to the SPS 708. Upon receiving the REQUEST message 800, the SPS modifies the customer's subscription data stored in the storage element 722. After the modification of the subscription data, the RPA 718 in conjunction with a Service__X application 720 formulates an IP__UPDATE message 802, formatted in an Internet protocol, and forwards the message to the SCP 724 and other appropriate network elements, if any. In this example, Service__X is assumed to require a network element that provides a voice service, such as an announcement. Accordingly, the SPS 708 also forwards the IP__UPDATE message 802 to the MRS 736.

The IP__UPDATE message 802 may be a single message, or may be comprised of a plurality of messages. In other words, the SPS 708 may send a single message to a plurality of network elements, or different IP__UPDATE messages to a plurality of network elements depending on the content of the REQUEST message 800. For activating Service__X, the IP__UPDATE message 802 comprises information fields for UserIdentification, Service, and Update Action. The DN is provided in the UserIdentification field; Service__X is provided in the Service field; and Activate is provided in the Update Action field.

At the SCP, in response to receiving the IP__UPDATE message 802, the customer's subscription data in the storage element 734 is modified. Similarly, at the MRS 736, the customer's subscription data stored in the storage element 740 is modified. After modifying the customer data in the storage element 734, the RSPA 730 in conjunction with the Service__X NSPA 732 formulates an AIN__UPDATE message 804, which is formatted in an AIN protocol, and causes the message to be forwarded to the SSP 842. Those skilled in the art will appreciate that the SSP 842 can be implemented using a Softswitch, which replaces an SSP in the IP world. The AIN specifications do not include Internet interfaces, but some AIN architectures have been modified to include Internet interfaces. The AIN__UPDATE message 804 comprises information fields for SSPUserResourceID, TriggerItemId, and ActivationStateCode. In this example, the SSPUserResourceID field is set to the DN, the TriggerItemId field is set to Service__X, and the ActivationStateCode field is set to On.

At the SSP 742, a trigger for Service__X is activated. After activating the Service__X trigger, the SSP 742 sends an AIN UPDATE__SUCCESS message 806, which is formatted in an AIN protocol and comprises a Return Result Component, to SCP 724. The Return Result component indicates that the update was successful. At the SCP 724, in response to receiving the AIN_UPDATE_SUCCESS message 806, the RSPA 730 in conjunction with the NSPA formulates an IP_RESPONSE message 808 and causes the message to be forwarded to the SPS 708. The IP_RESPONSE message 808 is formatted in an Internet protocol and comprises the DN and an update success indicator, which acknowledges to the SPS 708 that the update was successful. The SPS 708 delivers to the PC 702 a DELIVERY message 810, thereby informing the customer that his request to activate Service_X for the DN associated with the telephone 744 and the SSP 742 has been effectuated in real-time. Finally, the SPS 708 forwards appropriate billing information for the subscriber line associated with the DN to a billing system. A similar approach is taken if the customer requests deactivation of a subscribed service.

The present invention enables customers of communication services to subscribe and modify pre-provisioned communication services in real-time. The invention also allows the customers to monitor the status of the pre-provisioned services and the parameters of his subscribed services in real-time. By providing an easy way to activate or deactivate a service, the present invention allows customers of communication services to try a particular service for a limited period of time. A customer activates a service of interest and, if he finds that he is not using the service, he can simply deactivate it. Because the present invention allows subscriptions to and modifications of pre-provisioned services in real-time, the cost and delay associated with provisioning of communication services are reduced.

Additional alternative embodiments will be apparent to those skilled in the art to which the present invention pertains without departing from its spirit and scope. Accordingly, the scope of the present invention is described by the appended claims and is supported by the foregoing description.

What is claimed is:

1. A method for effectuating in real-time a request to modify a customer's communication service, comprising:

receiving a request to modify a customer's communication service at a computer server ("Server");

determining whether more than one network element needs to receive a message regarding the customer's request;

in response to receiving the request, formulating a first message in an Internet protocol format at the Server and forwarding the first message to a first network element, and forwarding the first massage to a second network element after formulating the first message at the Server;

in response to receiving the first message at the first network element, modifying a customer data stored in a storage element associated with the first network element and modifying a customer data stored in a storage element associated with the second network element in response to receiving the first message at the second network element;

at the first network element, after modifying the customer data in the first storage element, formulating the first message into a second message, the second message reformulated from the Internet protocol format into an advanced intelligence network (AIN) message format and forwarding the second message to a switch;

transferring a message between the first and second network elements to determine whether the customer data stored in the storage element associated with the second network element has been effectuated prior to the forwarding of the second message by the first network element to the switch;

in response to receiving the second message, modifying a trigger at the switch, formulating a third message, and forwarding the third message to the first network element;

in response to receiving the third message, formulating a fourth message in the Internet protocol format at the first network element and forwarding the fourth message to the Server, and in response to receiving the fourth message at the Server, delivering information to the customer, indicating that the request has been effectuated.

2. The method of claim 1, comprising:

modifying a customer data stored in a storage element associated with the Server in response to receiving the request at the Server.

3. The method of claim 1, further comprising:

formulating an alternate message in response to receiving the request at the Server and forwarding the alternate message to a second network element.

4. The method of claim 3, further comprising:

modifying a customer data stored in a storage element associated with the second network element in response to receiving the alternate message at the second network element.

5. The method of claim 4, further comprising:

transferring, a message between the first and second network elements to determine whether the customer data stored in the storage element associated with the second network element has been effectuated prior to the forwarding of the second message by the first network element to the switch.

6. The method of claim 1, further comprising:

forwarding a fifth message to a billing system in response to receiving the fourth message at the Server.

7. The method of claim 1, wherein the modifying the trigger at the switch comprises activating the trigger.

8. The method of claim 1, wherein the modifying the trigger at the switch comprises deactivating the trigger.

* * * * *